United States Patent [19]

Nelson

[11] Patent Number: 4,832,659
[45] Date of Patent: May 23, 1989

[54] SHAFT SUPPORT SYSTEM

[75] Inventor: Bertel S. Nelson, Naperville, Ill.

[73] Assignee: Candy Mfg. Co., Inc., Evanston, Ill.

[21] Appl. No.: 175,228

[22] Filed: Mar. 30, 1988

Related U.S. Application Data

[63] Continuation-in-part of Ser. No. 34,276, Apr. 2, 1987, abandoned.

[51] Int. Cl.⁴ .............................................. F16D 1/02
[52] U.S. Cl. ..................................... 464/178; 403/26; 403/286; 464/185
[58] Field of Search ............... 384/452, 453, 454, 455, 384/543, 546, 586, 587, 610; 403/26, 286; 464/155, 156, 160, 170, 178, 179, 182, 185

[56] References Cited

U.S. PATENT DOCUMENTS

| | | | |
|---|---|---|---|
| 823,083 | 6/1906 | Russell | 384/453 |
| 1,860,762 | 5/1932 | Wyrick | 464/155 |
| 2,141,810 | 12/1938 | Carroll | 384/546 |
| 2,360,786 | 10/1944 | Miquelon | 464/178 X |
| 2,749,191 | 6/1956 | Cole et al. | 464/178 X |
| 2,783,809 | 3/1957 | Haines | 74/424.8 B X |
| 2,862,372 | 12/1958 | Weidner | 464/182 X |
| 2,910,846 | 11/1959 | Butterfield et al. | 464/160 X |
| 3,050,965 | 8/1962 | Landrum | 464/160 |
| 3,563,104 | 2/1971 | Schuster | 74/395 |
| 3,610,714 | 10/1971 | DeGaeta | 384/453 X |
| 3,969,029 | 7/1976 | Schaeffler | 403/26 |
| 4,118,951 | 10/1978 | Neasham | 403/26 X |
| 4,484,786 | 11/1984 | Suzuki | 384/587 X |

*Primary Examiner*—Daniel P. Stodola
*Attorney, Agent, or Firm*—McCaleb, Lucas & Brugman

[57] ABSTRACT

A phase adjusting mechanism in which input and output shafts, rotatable at like speeds and directions, are positively intercoupled by helical spline members constructed and arranged so that a female spline member is shiftable axially relative to a male spline member to counter rotate the shafts through a limited range of relative adjustability and in which support of adjacent opposed ends of the shafts is effected by an internal backbone support extending coaxially between the shafts to provide thrust and radial bearing support therefor. Adjustment members for shifting the spline members is provided along with an indicator mechanism for indicating the degree of shaft phase adjustment. A locking mechanism is provided for securing the adjustment mechanism in selected positions.

6 Claims, 7 Drawing Sheets

SHAFT SUPPORT SYSTEM

This application is a continuation-in-part of application Ser. No. 034,276, filed Apr. 2, 1987, now abandoned.

This invention relates generally to timing mechanisms useful for advancing or retarding the timing relationship of machine parts and actions and more particularly to improvements in mechanisms for altering the phase relationship of rotatable input and output shafts thereof.

In its broader aspects this invention concerns a phase controlling transmission or gear box type mechanism adapted to be interposed between driving and driven means to transmit power therebetween and operable to adjust the phase angle relationship between input and output shafts which are rotatable in the same direction. The invention also concerns improved space saving structures for supporting coaxially aligned shafts.

Phase controlling transmissions or gear boxes for adjusting the phase angle relationship of input and output shafts are known in the art. Generally such have taken the form of a differential gear train employing a cage moveable about the input and output shafts and coupled to the latter by intervening bevel and pinion gears. Rotatable shifting of the cage serves to shift the axes of idler gears to adjust the phase relationship of the input and output shafts. Typifying devices of this order is that disclosed in U.S. Pat. No. 3,563,104, issued Feb. 16, 1971, to Schuster.

Such known devices are subject to several serious drawbacks. Since the differential bevel and pinion gears employed are in constant rotation in order to transmit power between the input and output shafts, speed of adjustment and operation are seriously limited accompanied by excessive heat, wear, noise, power loss and limited life span.

Added difficulty is encountered in attempting to achieve compactness due to inherent cumbersomness of the heavy gears involved, while in many instances the input and output shafts necessarily rotate in opposite directions and/or at unlike speeds.

The present invention overcomes these and other disadvantages of the prior art by providing an improved compact phase controlling device having input and output shafts which rotate in the same direction at a 1:1 ratio and having means capable of adjusting the angular or phase relationship of such shafts throughout an adjustment range of at least 360° either while running or at rest. Meshing pinion and bevel gears of the typical gear box differential, characteristic of the prior art, are eliminated by use of a unique helical spline connection between input and output shafts that provides a smooth, quiet, cool running, positive acting and long life mechanism in which either shaft may be used as the input shaft. Indicator means are provided to visually present the adjusted phase relation of the shafts and locking means operate to secure the adjustment means against positional drift from vibration or unauthorized operation and tampering. Novel means of supporting adjacent ends of axially aligned input and output shafts are employed comprising an internal backbone extending between such shafts and providing rotatable and thrust bearing support therefor.

With the above noted features in mind, a primary object of this invention is to provide a novel power transmitting mechanism having means for controlling the phase relationship of driving and driven shafts thereof.

Another object of this invention is to provide a power transmitting mechanism as aforesaid which provides selected phase adjustment of input and output shafts rotatable at like speeds and direction.

Another object of this invention is to provide a phase controlling transmission which is durable, compact, quiet running, dependable in operation and economical to manufacture and maintain.

Still another object of this invention is to provide a phase controlling means operable to adjust the relative angular position of input and output shafts through at least 360° of rotational adjustability.

A further object of this invention is to provide a compact phase controlling transmission for advancing or retarding the timing or phase relationship of input and output shafts which are positively coupled by spline means having zero velocity meshing engagement.

Still another object of this invention is to provide a phase controlling mechanism for transferring power between input and output shafts in which the shafts are positively coupled by helical spline means wherein one spline member is shiftable axially relative to a second spline member to effect counter rotation of said shafts, either while at rest or while running.

Another important object of this invention is to provide a novel, compact support structure for coaxially aligned rotatable shafts.

A still further object of this invention is to provide a novel mechanism for adjusting the timing relationship of rotatable shafts which includes means for adjusting the phase relationship of said shafts and means for locking said adjustment means in selected positions.

A further important object of this invention is to provide a phase controlling mechanism useful in adjusting the timing relationship of machine components and actions adjoined thereto.

Having described this invention the foregoing and further objects, features and advantages thereof will be recognized by those skilled in the art from the following detailed description of preferred and modified embodiments demonstrative of its concepts and features, illustrated in the accompanying drawings and representing the best mode presently contemplated for enabling those skilled in the art to make and practice this invention, from which it will be understood that this invention lies in the construction, arrangement and combinations of various parts and elements as more particularly defined in the claims appended hereto.

IN THE DRAWINGS

FIG. 1 PARTS 1A and 1B present an exploded perspective view of a phase adjusting mechanism according to this invention;

DESCRIPTION OF THE PREFERRED EMBODIMENT

Figure 1A:
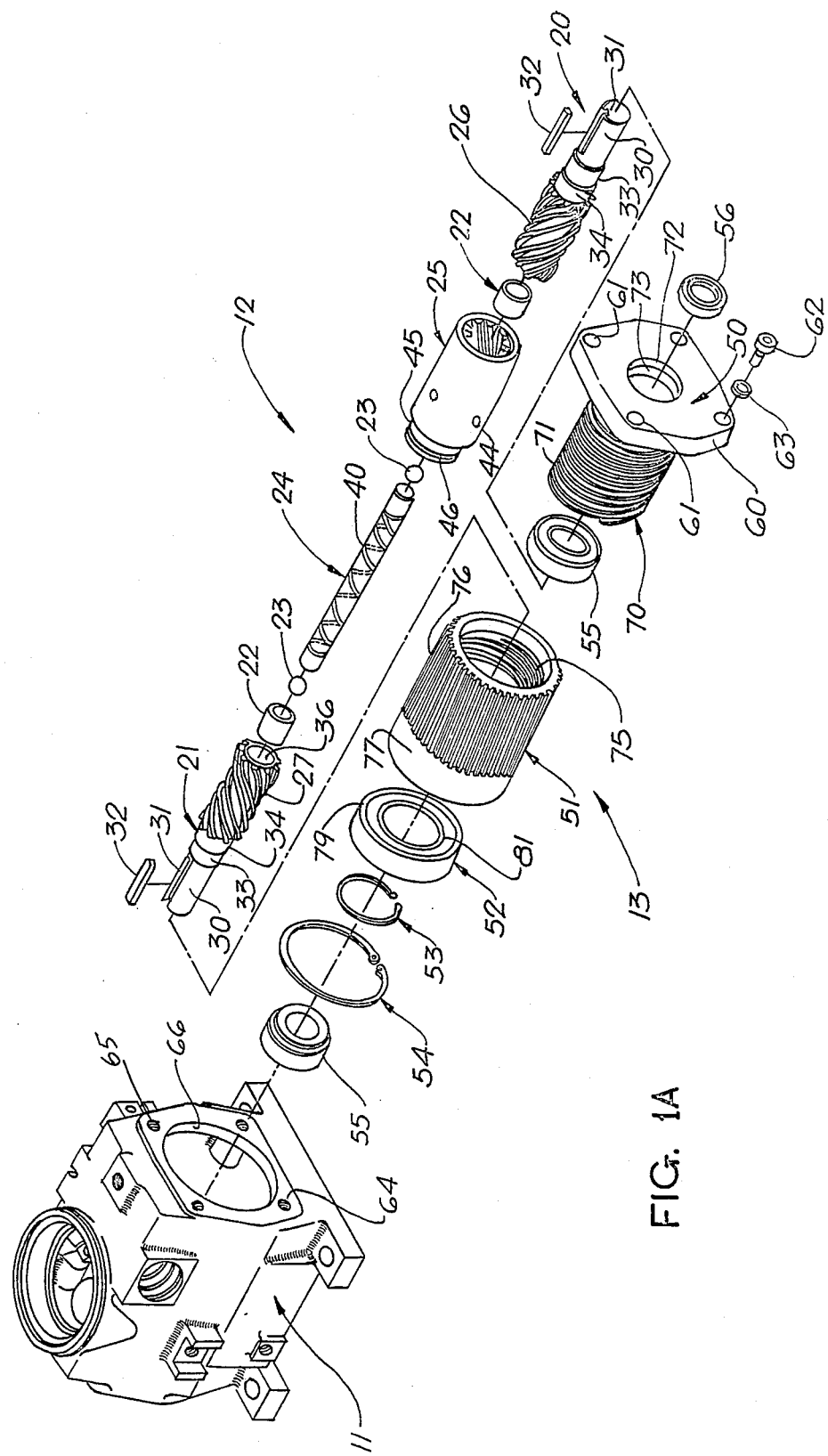

Turning now to the features of the phase adjustment mechanism illustrated in the drawings, initial reference is made to FIGS. 1–5 wherein a phase adjusting "positioner" according to this invention is shown.

A "positioner" as herein termed refers to a phase adjusting device having a limited range of adjustability as opposed to such a device having an infinite range of adjustability; the latter being typified by the mechanism of the aforenoted Schuester U.S. Pat. No. 3,563,104. In the immediate context of the hereinafter disclosed invention, the described "positioner" relates to mechanical transmissions for transferring power between rotatable input and output shafts and having the capability of altering the phase or angular relationship of such shafts.

Figure 1B:
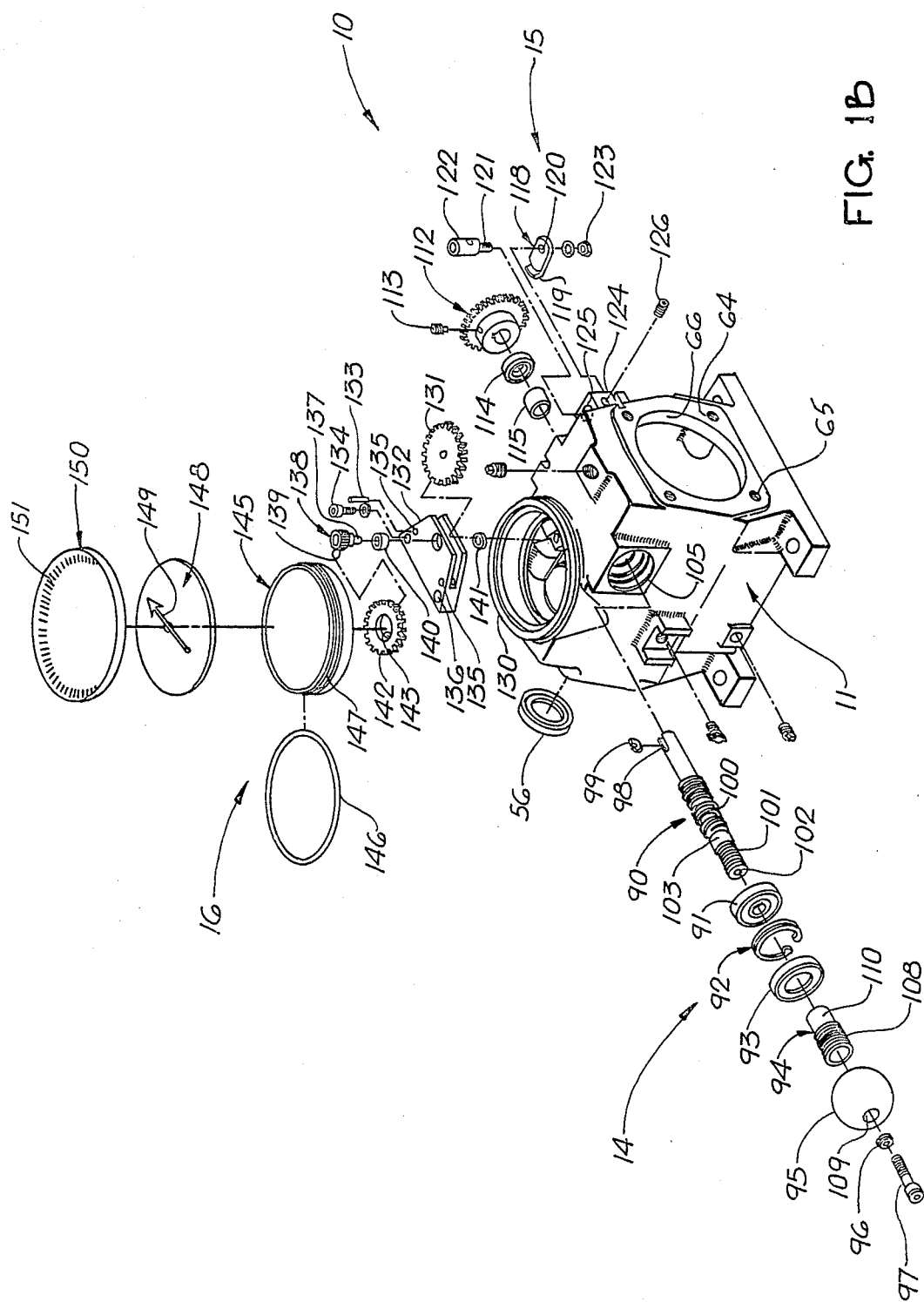

With the foregoing in mind, it will be recognized from FIG. 1, that a "positioner", indicated generally at 10 therein, comprises a protective outer housing means 11 for supporting a shaft means or assembly indicated generally at 12, positioning means 13 for adjusting the phase relationship of the shaft assembly; adjustment control means 14 for adjustably regulating the positioning means, locking means 15 for locking the the positioning means in selected positions and indicator means 16 for visually indicating the phase relation of the shaft means.

It will be appreciated that in the two part exploded perspective view of FIG. 1, the several items 12–16 enumerated above, are inclusive of individual parts involved therein. The assembled relationship of such parts will best be recognized from FIGS. 2–5 of the drawings as will be hereinafter described.

Shaft Assembly

As illustrated in FIG. 1 of the drawing, the shaft assembly 12 comprises an input shaft 20 and an output shaft 21 each coaxially receptive of an individual radial bearing 22, a thrust ball bearing 23 and a single backbone support member 24. Particulars of each of these elements of assembly 12 will now be described with reference to FIGS. 1–5 of the drawings.

The two shaft members 20 and 21 are identical except for external right hand helical splines 26 formed adjacent the operationally inner end of the input shaft 20 and similar left hand helical splines 27 formed adjacent the inner end of the output shaft 21. Such splines 26 and 27 are formed as male helical projections about the inner exterior ends of their respective shafts; the number of splines depending on the torque load to be transmitted by and between the shafts 20 and 21. In this latter regard it is to be understood that while shaft 20 is herein designated as an input shaft, either of the two shaft members 20 or 21 may constitute an input shaft or output shaft. Further, the right or left hand helical splines 26 and 27 may be reversed from the form herein illustrated so long as the helical splines on the two shafts are oppositely directed, that is one is right hand and one is left hand, for reasons that will appear presently.

Inasmuch as the formation of the two shafts 20 and 21 is identical except for the dispositon of the external helical splines as above noted, duplicate numbers will be utilized to designate corresponding portions of the two shafts. Specifically, each shaft has its outer end formed with a cylindrical stub shaft portion 30 having a key way 31 receptive of a mating key means 32 for purposes of coupling such stub shaft portion to an appropriate input or output shaft, sheave wheel, gear or similar power transmitting means. Axially adjacent the stub shaft portion 30 are a cylindrical shoulder portion 33 of slightly greater diameter than the stub shaft portion 30 and a slightly larger diametered second cylindrical shoulder portion 34. Extending axially between the larger cylindrical shoulder portion 34 and the inner end of each of the shafts are the previously noted helical splines 26 or 27. The two cylindrical shoulder portions 33 and 34 of each of the shaft members are provided for purposes of receiving bearing support and seal means associated therewith as will appear in greater detail hereinafter.

Figure 2:
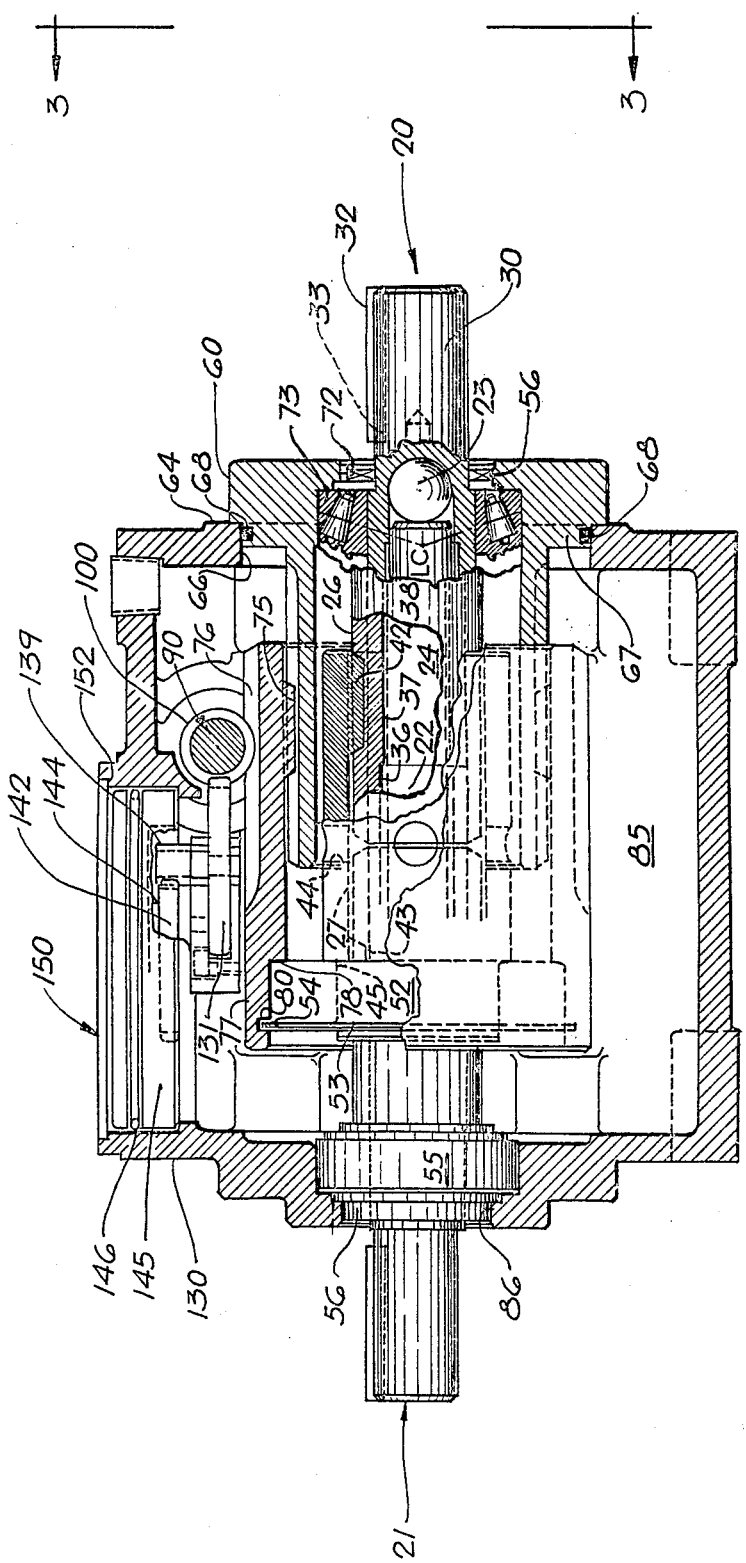
FIG. 2 is an enlarged longitudinal section with portions in elevation showing the assembled relation of parts for the mechanism of FIGS. 1A-1B.

As best shown in FIGS. 1 and 2, each of the shafts 20 and 21 is bored to provide a cylindrical bore extending coaxially inwardly of the splined inner end thereof: such bore comprising a first larger diametered portion 36 receptive of a radial bushing or needle bearing 22 adjacent the inner end of the associated shaft member 20 or 21. Formed axially adjacent the portion 36 is a second smaller diametered portion 37 which provides slight clearance of the passage of the cylindrical backbone support member 24 while a third, smallest diametered portion 38 of the bore axially adjacent the intermediate diametered portion 37, is closely receptive of a ball thrust bearing 23 in assembly and radially supports the backbone shaft. Portion 38 terminates substantially opposite the intersection of the stub shaft portion 30 and the external shoulder portion 33 of the shaft.

As noted the bearings 22 fit into the enlarged bore portions 36 of the respective input and output shafts in assembly; such constituting permanently lubricated bushings or needle bearings having an internal diameter closely filling with the external diameter of the backbone 24 which is adapted to be inserted coaxially therethrough in the bored openings of the two shafts; extending thereinto to engage the single ball bearings 23.

Support member or backbone 24 as best shown in FIG. 1, comprises an elongated cylindrical rod having a groove 40 formed inwardly of its outer cylindrical surface and extending substantially throughout its length for purposes of lubrication of the bearings 22 as well as the single bearing members 23 since the shafts 20 and 21 are adapted to rotate relative to the backbone during phase adjustment. The provision of the backbone in conjunction with the bearings 22 serves to radially support the inner ends of the two shafts 20 and 21 in lieu of one or two ball bearing assemblies disposed about the inner ends of the shafts in accordance with more conventional practice. This support structure is compact and space saving and provides an unique bearing support permitting substantial radial or overhang loads to be applied to the protruding input and output shaft ends. In addition, the single ball bearings 23, which bear against the inner ends of the backbone adapt the support structure to transmission of thrust loads between the two shafts 20 and 21.

It is important to recognize that the backbone support ideally is of a length to intersect or extend to or beyond the effective load centers of the loaded main shaft bearings 55 carried by housing 11, as shown in FIG. 2. This construction establishes the rotating center line of the backbone coincident with the rotating center line of the main bearings and their load centers. Termination of the backbone substantially inboard of such bearing load centers would result in an unstable backbone support.

The effective load center is that point where the line of action of the loaded bearing intersects the center line of bearing rotation. This point varies depending on the type of bearing involved. In the case of a ball bearing the rotational center of the bearing and its effective load center may or may not coincide depending on the presence or absence of thrust loads. In a taper roller bearing as illustrated in FIG. 2 the effective load center (L.C.) is displaced along the rotational axis or center line of the bearing, similar to the thrust load condition of a ball bearing. For a radial sleeve bearing the effective load center and rotational center coincide.

In order to couple the input and output shafts 20 and 21 for the transmission of torque and axial thrust loads therebetween, the double spline nut 25 is provided which, as shown in FIGS. 1 and 2 in particular, comprises a generally cylindrical member having oppositely directed interior helical spline portions 42 and 43 adjacent the opposite ends thereof. Such spline portions preferably are formed as female splines closely receptive and threadingly interfitting with the extending male splines 26 and 27 on the input and output shafts, respectively. (see FIG. 5). The cylindrical body of the nut 25 is preferably provided with one or more centrally disposed oil openings 44 permitting the flow of oil into the interior of the nut in operation. An external cylindrical shoulder portion 45 is formed adjacent one end of the nut which is receptive of the splined portion 27 of the output shaft. This cylindrical shoulder 45 is formed with an inwardly extending annular groove 46 adjacent its outer end for purposes which will appear presently.

It will be appreciated and recognized from the above description of the shaft assembly 12 that with the left and right hand helical splines on the input and output shafts 20 and 21, respectively, mating with the internal female spline portions 42 and 43 of the double spline nut member 25, the input and output shafts are secured together for conjoint rotation to transmit torque or power therebetween. In addition, however, axial shifting of the nut member 25 relative to the two shafts 20 and 21 will effect counter rotation of such shafts whereupon the phase or relative angular relationship of such shafts will be altered accordingly to shift the timing relationship of parts and mechanisms associated with the output shaft. Thus the phase shifting objective of this invention is basically accomplished by shifting the double splined nut relative to the input and output shafts engaged thereby. It further is to be appreciated that by employing the helical male and female splined connection between the shafts 20, 21 and the double spline nut 25, a very close fitting, quiet, smooth and cool running coupling of the shafts is accomplished. This is particularly important inasmuch as the nut 25 rotates with the two shafts or may be shifted axially to effects relative counter rotation between such shafts. Such a coupling also provides a positive one to one rotational ratio between the input and output shafts causing such shafts to rotate in the same direction.

Positioning Means

It will be recalled from the preceeding description that in order to effectuate the desired counter rotational or relative angular movement between input and output shafts, it is necessary to axially shift the double helical nut member 25 along the male helical splines 26 and 27. While this function may be accomplished by a variety of means, typcially a shifting yoke engaging the nut 25 and responsive to an adjustable screw means, for instance, a more compact, easier operating and accurate positioning means 13, as herein illustrated, is preferred.

With particular reference to FIG. 1 of the drawings, means 13 is shown as comprising a stationary combination cover and support member 50 adapted to be fastened to housing 11, a shifting sleeve 51, a ball bearing assembly 52 and outside and inside locking rings 53 and 54, respectively. In addition to such listed elements the exploded perspective illustration of FIG. 1 also includes a pair of taper roller shaft bearing assemblies 55,55 for externally supporting the shaft assembly 12 and a pair of oil seals 56,56 adapted to be mounted in sealing engagement with housing 11 about the input and output shafts 20 and 21. These bearing assemblies 55 and seals 56 do not in fact constitute active elements of the positioning means 13 as will be better understood by the description which follows.

Turning now to the specifics of the cover and support member 50, it will be recognized that the same has a generally hexagonal profiled mounting flange portion 60 at one end thereof. Such flange portion is provided with four through holes, 61,61 for reception of cap screw 62 and lock washers 63 whereby to secure the flange portion to the one end of the housing 11. More specifically flange portion 60 is fitted over a machined end wall platform 64 of the housing having threaded openings 65 receptive of the machine screws 62 in assembly. Liquid tight seal is effected between the periphery of an enlarged central opening 66 axially of the housing's platform portion 64 and an interfitting reduced cylindrical shoulder portion 67 of the cover member by means of an o-ring 68, as best shown in FIG. 2.

Extending coaxially outwardly from one side of the mounting flange 60 is a cylindrical hub portion 70, formed with an exterior acme thread 71 thereabout. Coaxially of the hub portion 70 and centrally of the flange portion 60 is a shouldered cylindrical opening 72 having a larger counter bored portion 73 which receives the bearing member 55 for input shaft 20. An oil seal ring 56 correspondingly is fitted into the smaller diameter opening 72, as shown in FIG. 2 when shaft 20 is mounted in housing 11.

Shifting sleeve 51 comprises a cylindrical member of internal diameter greater than that of the exterior diameter of cylindrical hub portion 70, so as to fit coaxially thereabout. An internal acme thread 75 is formed partially along its internal cylindrical surface for meshing engagement with the external acme thread 71 of the cover and support member. Thus rotational movement of the sleeve member 51 effects its axial movement along the acme threads 71.

In addition to the internally disposed acme thread 75 the sleeve member 51 has external worm gear teeth 76 formed about a major axial part of its cylindrical body for engagement by adjustment means 14, as will be described presently. At the opposite end of the sleeve member 51 from its internal acme thread, is a counterbore forming an internal cylindrical shoulder 78 into which an outer race 79 of the ball bearing assembly 52 is pressed. Bearing 52 is locked axially to the sleeve member 51 by the internal snap ring 54 which is received in kerf 80 in shoulder 78 as best shown in FIG. 2. With this arrangement the external cylindrical race of the bearing assembly 52 is rotatably and axially moveable with the shifting sleeve 51.

Figure 5:
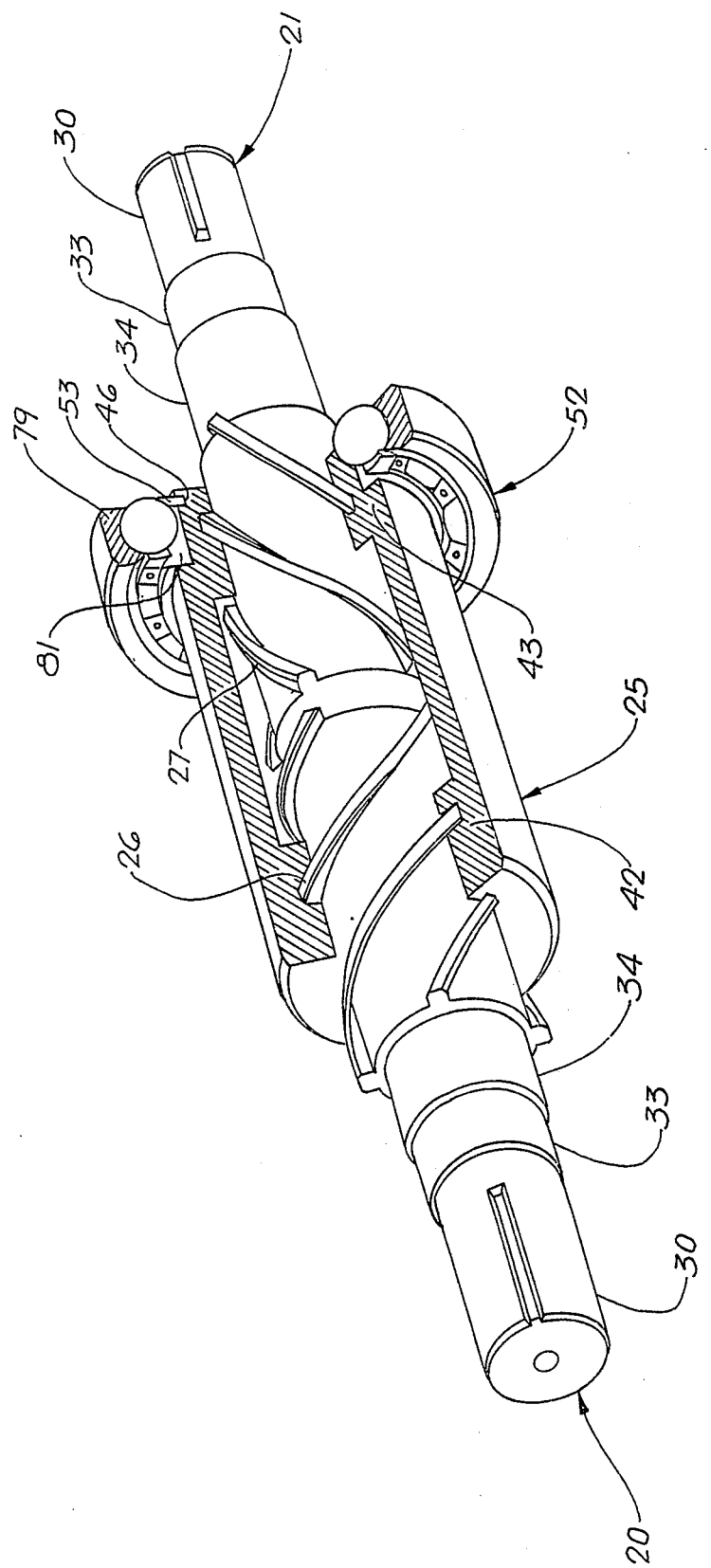
FIG. 5 is a perspective view with portions broken away in section of the shaft assembly employed in the mechanism of FIGS. 1-4.

The positioning means 13 is designed to interfit with the shaft assembly 12 as follows. As clearly shown in FIG. 5 of the drawings, the shaft assembly 12 has the inner race 81 of ball bearing assembly 52 pressed onto the cylindrical shoulder 45 of the internally splined nut 25. The bearing assembly 52 is locked axially to nut 25 by means of the external snap ring 53 which fits into groove of kerf 46 in shoulder 45. This subassembly is then inserted into the assembled positioning means with the input and output shafts 20 and 21 having the shaft taper roller bearing assemblies 55,55 thereof pressed onto the cylindrical shoulders 34 of the shaft members. The subassembly of FIG. 5 is inserted coaxially into the cover and support member 50 in accordance with the assembled relationship of parts illustrated in FIG. 2 of the drawings. The flange portion 60 of the cover member is then bolted to the machined platform 64 at one end of the housing 11 so that the assembled shaft and positioning means extend across an interior chamber 85 of housing 11. The seal members 56 are then pressed into place about the input and output shafts with the seal member 56 associated with the output shaft 21 being pressed into a cylindrical seat 86 bored in the opposite end of the housing 11 from that which receives the cover member 60. It will be recognized, that the interior chamber 85 of the housing constitutes a sump receptive of a suitable lubricant whereby the shaft assembly and positioning means parts, particularly those which rotate in operation, are adequately lubricated.

It will be appreciated that with the assembled shaft and positioning means so intermounted, that the inner race 80 of the shifting bearing assembly 52 is tightly pressed onto shoulder 45 of the double spline nut 25 and moves with the latter member both axially and rotatably. The outer race 79 of bearing assembly 52 on the other hand is locked to the shifting sleeve member 51 to move with that member as the same is rotatably moved along the acme threads 71 associated with the cover and support member 50. It thus will be understood that axial movement of the bearing assembly 52 which is fastened to the double spline nut 25, causes the latter to be shifted axially over the shafts 20 and 21. Such axial shifting takes place in response to operation of the adjustment control means 14, as will now be described.

Adjustment Control Means

Figure 3:
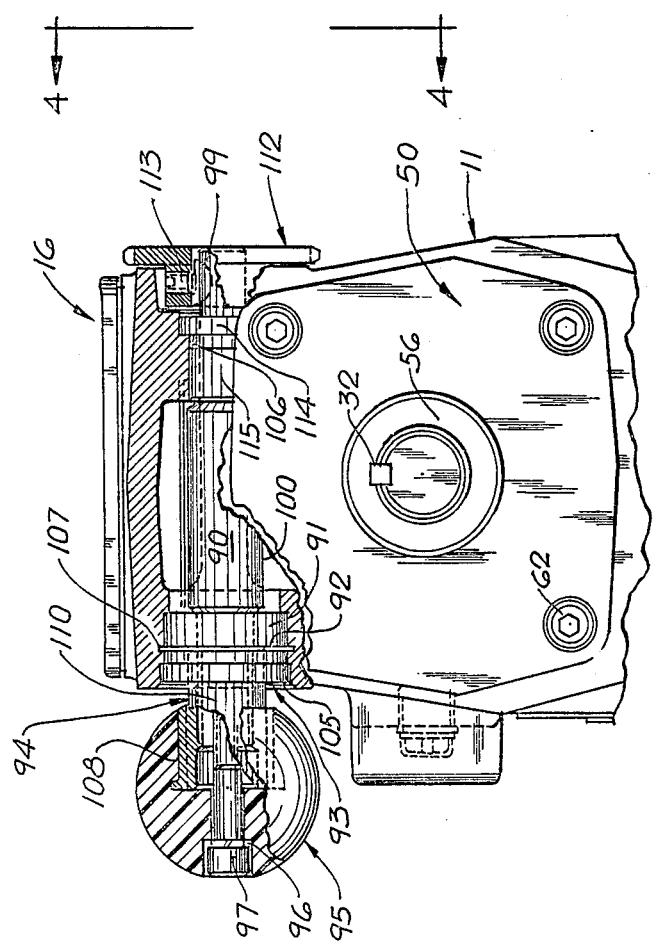
FIG. 3 is a partial end elevation thereof with parts broken away in section taken substantially from vantage line 3—3 of FIG. 2.

In order to control rotational movement of the shifting sleeve 51 for advancing or retracting the same along the acme threads 71, the adjustment control means 14, as illustrated best in FIGS. 1 and 3 of the drawings comprises an assembly of a worm 90, a ball bearing assembly 91, an internal snap ring 92, an oil seal 93, a control knob adapter 94, control knob 95, lock washer 96 and cap screw 97. The disassembled relationship of such parts are illustrated best in FIG. 1 and the assembled relation thereof is found in FIG. 3.

From FIG. 1, in particular, it will be recognized that worm 90 comprises an elongated cylindrical member or shaft having a key way slot 98 milled adjacent one end thereof receptive of a woodruff key 99 or the like and is formed with a continuous external helical worm 100 adapted to engage the worm gear 76 of the shifting sleeve member 51. The end of the worm shaft 90 opposite that bearing the key way slot 98 is exteriorally threaded at 101 and has an axially extending bore opening inwardly of such end which is suitably internally threaded, as indicated at 102. An outside cylindrical shoulder portion 103 is provided intermediate the threaded end portion 101 and the worm threads 100 for close fitting engagement with the inner race of the ball bearing assembly 91 which is mounted thereon.

This assembled relationship of the worm member 90 and bearing assembly 91 will best be recognized in FIG. 3 of the drawings from which it will also be appreciated that the worm member is adapted to be mounted across the upper end of the housing 11 extending coaxially of a pair of openings 105 and 106. Worm 90 is aligned at right angles to the axis of the input and output shafts mounted across the sump chamber 85 of the housing. The opening 105 is suitably shouldered to provide matching diameters for reception of the bearing assembly 91 and the oil seal 93 about the worm shaft 90; snap ring 92 engaging a kerf 107 in the wall of opening 105 to axially lock the bearing 91 in place. The opening 106 in the housing 11 is likewise shouldered for reception of additional bearing and oil seal means, as will appear hereinafter in association with the description of the locking assembly 15. Suffice it to note that the worm shaft 90 is suitably supported for rotational movement about its longitudinal axis with the external worm 100 thereof in meshing engagement with the worm gear 76 of the shifting sleeve as above noted.

In order to manually rotate the worm shaft 90, adapter 94 is provided comprising a cylindrical member internally threaded at one end for engagement with the externally threaded end portion 101 of the worm shaft. A larger diametered externally threaded portion 108 is provided near the adaptor's opposite end to engage a threaded socket formed inwardly of one side of the generally spherical control knob 95 and in coaxial alignment with an opening 109. In assembly the adaptor 104 has an unthreaded cylindrical portion 110 which fits coaxially within the oil seal 93 and threadingly engages the externally threaded end portion 101 of the worm member. The control knob 95 is thereafter threaded onto the exterior threads 108 of the adapter and locked in place by means of the cap screw 97 and intervening lock washer 96 as best shown in FIG. 3 of the drawings. Thus manually engageable means is provided for manipulating the otherwise housed worm member 90 to effect rotational movement of the shifting sleeve 51 and advance or retract the same along the acme threads of the stationary hub 70. If desired, automatic adjustment of worm member 90 may be effected by replacing knob 95 with a reversible electric motor, according to know practice.

Intermeshing relationship between the worm 100 and the worm gear 76 is such that one revolution of the worm effects a 6° rotation of the output shaft relative to the input shaft. In the illustrative embodiment hereof the locking means 15 is employed for positively holding the adjustment means 14 in desired position of rotation whereby to fix the phase angle of the output shaft at desired positions of adjustment.

Locking Means

Figure 4:
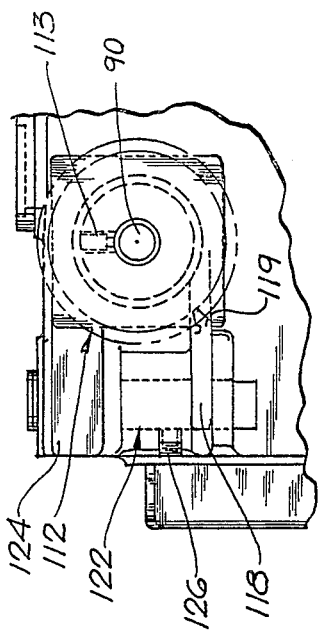
FIG. 4 is a partial rear elevation thereof showing particulars of means for locking the adjustment mechanism thereof taken substantially from vantage line 4—4 of FIG. 3.

As shown in FIGS. 1, 3 and 4 locking means 15 comprises a locking gear 112 which fits over the outer cylindrical end of the worm shaft 90 exteriorly of housing 11 and is equipped with a suitable threaded opening receptive of a set screw 113 for engaging the woodruff key 99. This secures the gear 112 to the worm shaft 90 axially outwardly of an oil seal 114 and a needle bearing assembly 115 which coaxially surround and support the cylindrical end portion of the worm shaft 90. The bearing assembly 115 and oil seal 114 are mounted coaxially within the bored opening 106 formed near the upper end of the housing as previously noted.

The locking gear 112 comprises a straight tooth spur gear, the teeth of which are disposed outside of housing 11, as best shown in FIG. 3. It will be appreciated that the gear 112 rotates coaxially with the worm shaft 90 in accordance with the manipulation of the control knob 95.

In order to secure the worm shaft 90 in desired positions of rotation as above explained, a locking pawl member 118, has a projecting tooth portion 119 at one end thereof to engage between the teeth of gear 112. An irregular opening 120 is formed adjacent the opposite end of the pawl to intergagingly fit over a mating stem portion 121 of a cylindrical lock assembly 122. The stem portion 121 is externally threaded at its outer end for engagement by lock washer and nut means 123 whereby to positively secure the pawl member 118 for horizontal rotational movement with stem 121 in accordance with the key opertion of the cylinder lock. The lock assembly, as best viewed in FIG. 4, is mounted vertically in a projecting boss portion 124 formed on the exterior on the housing 11 and provided with a suitable through opening 125 receptive of the lock assembly 122. A set screw 126 threads through one wall of boss 124 to secure the lock cylinder in place.

In operation rotational movement of the lock cylinder serves to swing the pawl member 118 about a vertical axis so that the toothed outer end 119 thereof may enter and engage between adjacent teeth of the lock gear 112 thereby preventing manual rotation of the worm shaft 90 and securing the latter in a designated position of adjustment.

Indicator Means

To enable the operator to determine the relative angular disposition of the input and output shafts or, that is, their phase relationship, in accordance with the positioning of the adjustment assembly 14, visual indicator means 16 are provided, as best shown in FIGS. 1 and 2 of the drawings.

As there shown, means 16 is adapted to be mounted within an enlarged open centered boss 130 projecting from the upper side of the housing 11 and comprises a helical worm gear 131 which engages the worm shaft 90 so as to rotatably respond to rotational adjustment of the worm shaft as above described.

A bifurcated bracket means member 132 having a substantially trapezoidal shaped plan profile is adapted to be fixed to appropriate support portions of the housing 11 by means of pins 133 and cap screws 134 receptive in openings 135 and 136, respectively, of the bracket means 132. The helical gear 131 is staked to a cylindrical portion 137 at the lower end of a spur pinion member 138 having a spur gear portion 139 formed at the upper end thereof to extend above bracket 132. Suitable bushing members 140, 141 are disposed above and below the helical gear 131 and serve to rotatably support the spur pinion 138 on the bracket.

The spur gear portion 139 of pinion member 138 meshes with the peripheral teeth of an indicator spur gear 142 having an enlarged central opening 143 as best shown in FIG. 1. Opening 143 fits coaxially over a depending cylindrical hub portion 144 (see FIG. 2) formed centrally on the underside of a generally cylindrical indicator body 145 which seats within the enlarged central opening of the housing boss 130. Spur gear 142 preferably is of plastic material such as Delrin and is glued or otherwise welded to the hub portion 144 of the indicator body in assembly. An o-ring seal 146 loosely fits in channel groove opening 147 formed about the periphery of the indicator body 145 to engage the internal walls of open boss 130 to effect a moisture seal while permitting rotational movement of the indicator body in operation.

A plastic indicator cover 148 of circular formation, having an indicator arrow 149 on the upper face thereof is suitably glued or otherwise affixed to the upper wall of the indicator body 145 in assembly. A protective window 150 having an appropriate indicia scale 151 silk screened or otherwise provided on the underface thereof overcovers the indicator dial and is glued to an annular seat shoulder 152 formed at the upper end of boss 130, as best shown in FIG. 2.

With the aforedescribed arrangement it will be understood that rotational adjustment of the worm shaft 90 serves to rotate the indicator body 145, indicator cover and arrow 149 relative to the stationary indicia on the under face of the cover window 150. This serves to indicate the relative angular position of the input and output shafts 20 and 21. In the particular embodiment illustrated in FIG. 6A, the indicator arrow 149 is adapted to move clockwise or counterclockwise from the 0° position covering a range of substantially 400° of relative movement between the respective input and output shafts. It will be noted that the indicator dial on the cover 150 preferably is marked in plus or minus directions from the zero position thereon with the spacing between each scribe mark of the indicator dial equaling 1.635°. Since the described apparatus is a positioner, as hereinabove defined, which has a limited degree of adjustability, in this case limited by the axial movement of the double splined nut 25, there is a stop zone on the indicator dial as shown at 153 indicating the limits of adjustability.

Modified Positioner

Figure 6:
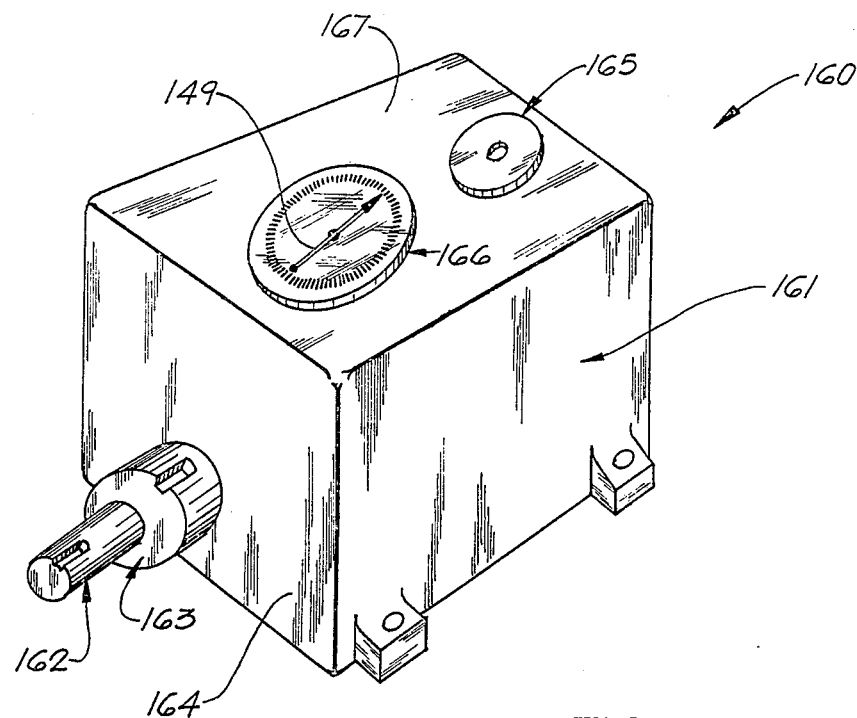
FIG. 6 is a perspective view of a modified form of the invention in which input and output shafts are concentric.
Figure 6A:
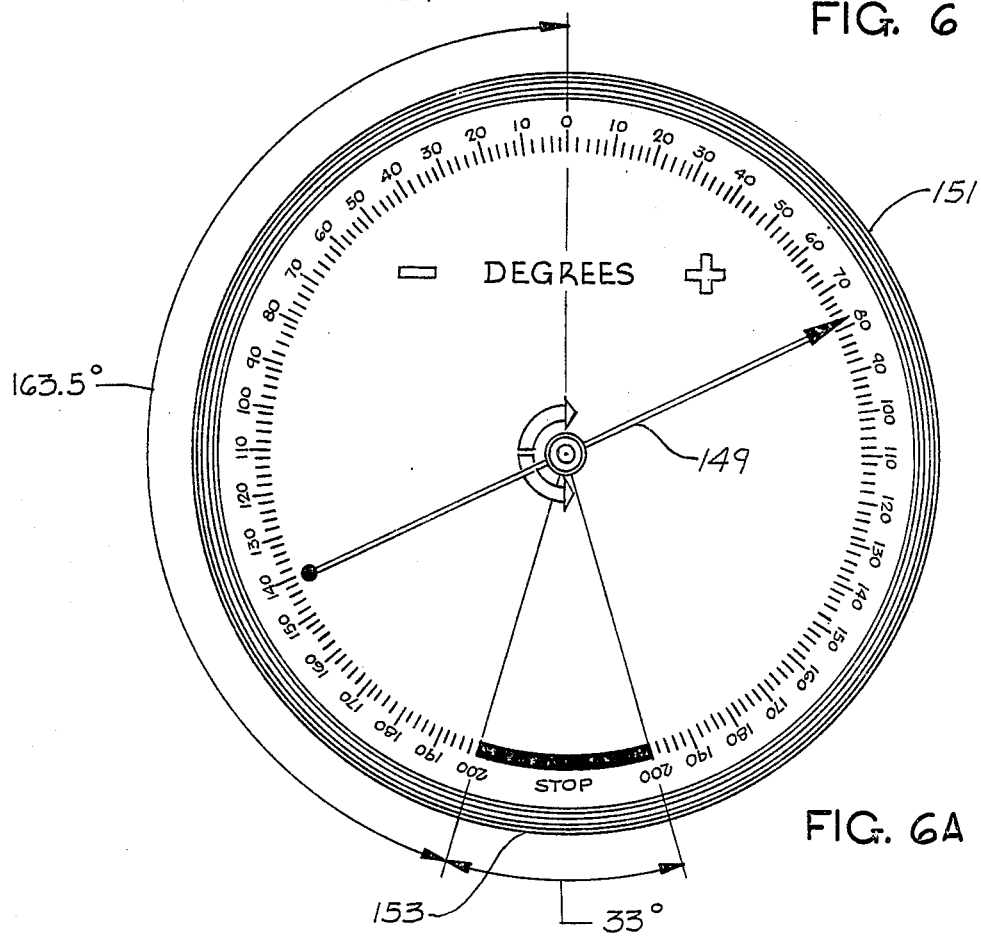
FIG. 6A is a detailed plan of the indicator shown in FIG. 6.
Figure 7:
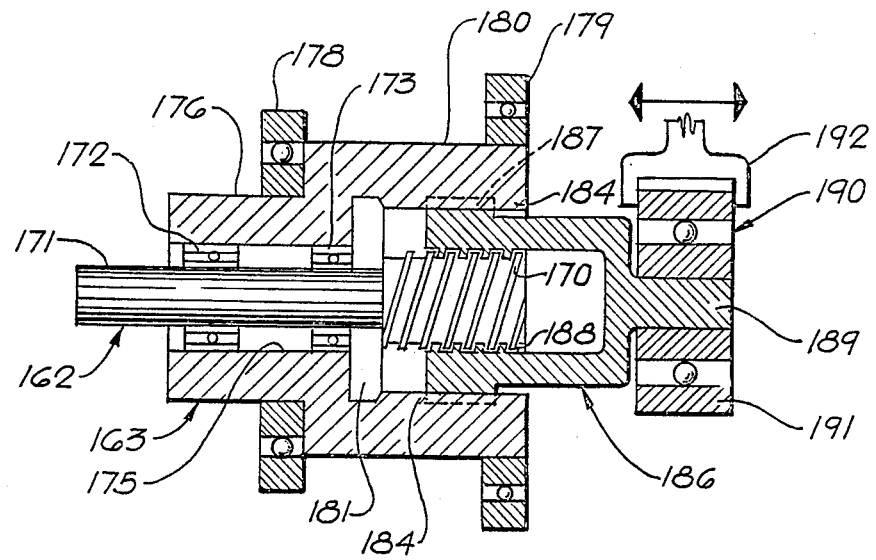
FIG. 7 is a schematic sectional view showing the arrangement of the concentric shafts and adjustment means employed in the modified mechanism of FIG. 6.

Turning now to FIGS. 6 and 7 of the drawings, a modified version of the foregoing described positioner device, indicated at 160, comprises a cast metal housing means 161 having an input shaft 162 and an output shaft 163 which are concentrically arranged and extend outwardly of one wall 164 of the housing means 161. Phase adjusting means 165 and indicator means 166 are provided on the upper wall 167 of the housing means.

With particular reference to FIG. 7, the internal arrangement of the working elements are represented thereat, comprising the input shaft 162, which in all respects is identical to input shaft 20 heretofore described. The output shaft 163 of this modified form, however, is concentrically arranged about the input shaft 162. As before either shaft may be an input or output shaft.

As in the embodiment of FIGS. 1–5, input shaft 162 comprises an external helically splined portion 170 and a generally cylindrical shaft portion 171 extending coaxially from said helical portion which may be cylindrical as schematically represented in FIG. 7 or appropriately stepped to receive ball bearing assemblies 172 and 173. Such bearing assemblies have their inner races pressed on and locked to the shaft portion 171 of the input shaft and outer race portions which are press fitted and locked into a cylindrical bore 175 coaxial of a shaft portion 176 of the output shaft 163. Thus the output shaft is supported for rotational movement relative to the input shaft in operation. In addition to the bearing assemblies 172 and 173 the output shaft 163 is externally supported by ball bearing assembly 178 engaging the external wall of the shaft portion 176 and bearing assembly 179 engaging the external cylindrical wall of an axially extending and larger diametered gear portion 180 of the output shaft.

Gear portion 180 has a chambered cylindrical interior 181 open at one end and communicating coaxially with bore 175 to receive the input shaft in assembly. Internally the gear portion 180 is provided with helical splines 184 formed in an opposite direction to the external splines 170 of the input shaft, i.e., right hand splines on one shaft versus left hand splines on the other shaft, or vice versa.

A double spline nut member 186 is disposed concentrically between the spline portions 170 and 184 of the two shafts; such nut having left and right hand splines 187 and 188, for respectively engaging the spline portions 184 of the output shaft 163 and splines 170 of the input shaft 162. The splines on the double spline nut member 186 serve to positively interlock the input and output shafts adjacent their axial inner ends, as in the first described embodiment, for simultaneous rotation in the same direction at a 1:1 ratio. In addition, as with the first described double spline nut 25, nut 186 is adapted to be shifted axially with respect to the input and output shafts whereby to effect counter rotational movement of such shafts and thus adjust their relative phase angular relationship.

In order to accomodate rotational movement of the spline nut as well as the axial shifting thereof, the body of the spline nut is provided with a stub shaft portion 189 at its outboard end which is coaxially aligned with input shaft 162 and is pressed into and axially locked with the cylindrical inner race of a supporting ball bearing assembly 190. Thus the splined nut is rotatable with the input and output shafts.

To achieve axial shifting of the splined nut, the outer race 191 of bearing assembly 190 is engaged by a suitable shifting mechanisms, such as a conventional shifting fork, indicated at 192. The fork may be moved by any of a number of conventional mechanisms, such as a threaded shaft coupled thereto for moving the fork and bearing assembly 190 in response to adjustable rotation of the adjustment knob 165. Likewise the indicator means 166 may driven by conventional means coupled to the threaded adjusting shaft.

From this brief description of the modified embodiment illustrated in FIG. 6 and 7, it will be understood that the basic concept of using a double splined nut axially shiftable relative to splined portions of input and output shafts is present in the modified device 160 and that the input and output shafts of the modified device are coaxially aligned and adapted to rotate in like directions at a 1:1 ratio, as in the first described embodiment.

Again due to the limitations of axially shifting the bearing assembly 190, the positioner device 160 is limited in its range of adjustability, thereby constituting a "positioner" in accordance with that terminology as herein employed.

USE AND OPERATION

Figure 8:
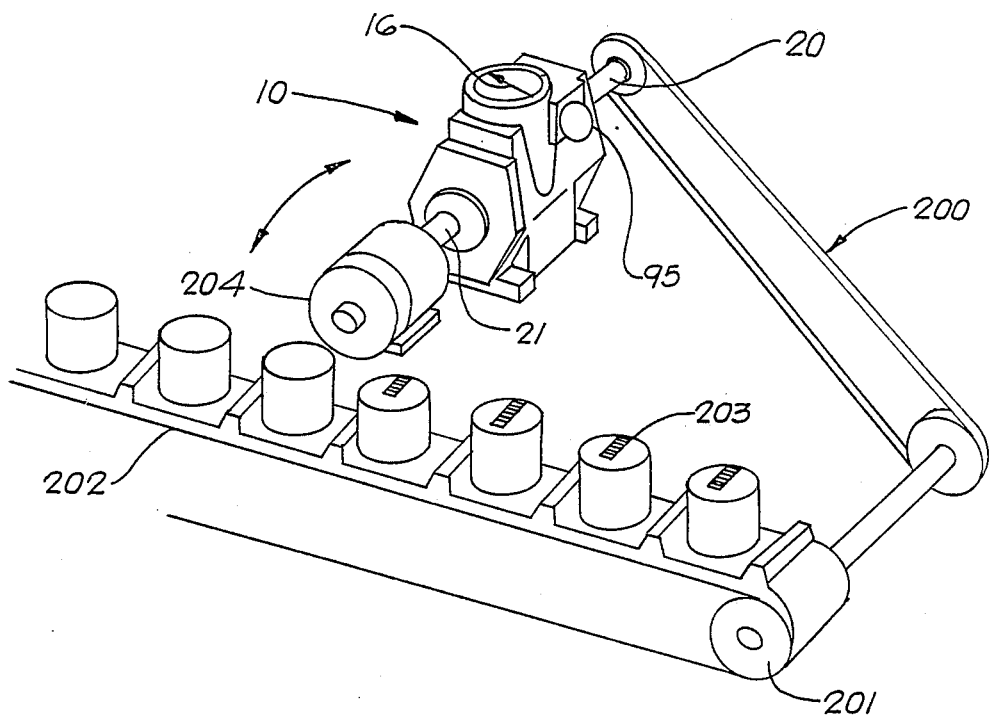
FIG. 8 is a schematic perspective showing a typical application of a phase adjusting mechanism according to this invention.

With particular reference to FIG. 8 of the drawings, there is therein illustrated a typical use application for a positioner device 10 as hereinabove described. As shown the input shaft 20 of the positioner 10 is coupled by sheave wheel and belt means 200 to a driving source comprising a rotating drive roller 201 of a conveyor having a moving belt 202 on which articles 203 to be imprinted by rotatable printer head 204 are positioned. Adjustable rotation of the control knob 95 associated with positioner 10 to vary the relative angular disposition of the input shaft 20 and output shaft 21 thereof as heretofore explained, serves to adjust the timing relationship of the printer head 204 with respect to the movement of the articles 203 therepast. In this manner of proper registration of the printed symbol on the articles may be achieved.

From the foregoing it is believed that those familiar with the art will readily recognize and appreciate the advancement presented by the novel phase adjusting mechanism in accordance with this invention and will readily understand that while its features and concepts have been hereinabove described in association with preferred and modified embodiments thereof, the same is susceptible to wide variation, modification and substitution of equivalents without departing from the spirit and scope thereof as defined in the hereinafter appended claims.

What is claimed is:

1. A shaft support system comprising:
   a pair of coaxially aligned, relatively rotatable shafts adapted to transmit torque and thrust loads, said shafts having coaxial bores opening inwardly of adjacently opposed ends thereof; external thrust bearing means for rotatably supporting each said shaft remotely of said opposed ends, a single rigid backbone member journaled in said bores and extending coaxially between said shafts, additional bearing means within said bores for internally supporting said shafts for rotation on said backbone member; the said backbone member being arranged and of sufficient length so that it intersects the effective load centers of said external bearing means.

2. A shaft support system comprising:
   a first rotatable shaft having a first internal blind bore extending coaxially inwardly of one end thereof, a second rotatable shaft having a second internal blind bore extending coaxially inwardly of one end thereof, said first and second shafts being coaxially aligned with the said one ends thereof adjacent; a single rigid backbone support shaft rotatably journaled in said first and second bores and extending coaxially between said adjacent one shaft ends, and bearing means externally supporting each said shaft intermediate its ends for rotational movement; said backbone support shaft extending axially beyond the effective load centers of said bearing means.

3. The support system of claim 2, and a single ball bearing mounted between and engaging the closed end of each said bore and an adjacent end of said backbone shaft for transmission of thrust forces between said first and second shafts.

4. The support system of claim 2, and radial bearing means rotatably supporting said backbone shaft in each said bore; either of said first or second shafts being rotatable relative to said backbone shaft.

5. A shaft support system comprising: a pair of coaxially aligned relatively rotatable shafts having adjacent opposing ends, bearing means for externally, rotatably supporting said shafts remotely of said ends; and a single elongated rigid support means mounted and arranged internally of said shafts to extend coaxially thereof between said ends and intersect the effective load centers of said bearing means whereby to effect stabilized internal radial support of said shafts adjacent said ends.

6. The shaft support system of claim 5, wherein said support means comprises a rigid cylindrical backbone shaft having its longitudinal axis coincident with the rotational axes of said pair of shafts and being of sufficient length to extend to or beyond the effective load centers of said bearing means.

* * * * *

UNITED STATES PATENT AND TRADEMARK OFFICE
CERTIFICATE OF CORRECTION

PATENT NO. : 4,832,659

DATED : May 23, 1989

INVENTOR(S) : Bertel S. Nelson

It is certified that error appears in the above-identified patent and that said Letters Patent is hereby corrected as shown below:

Col. 3, line 49, "drawing", should be "drawings".

Col. 4, line 35, "of the" should be "for the". (1st occurr)

Col. 4, line 47, "filling", should be "fitting".

Col. 8, line 59, "know", should be "known".

Col. 8, line 66, "position", should be "positions".

Signed and Sealed this

Twenty-first Day of August, 1990

Attest:

HARRY F. MANBECK, JR.

*Attesting Officer*     *Commissioner of Patents and Trademarks*